No. 618,962. Patented Feb. 7, 1899.
R. C. STEWART, Jr. & W. A. STEWART.
BAR FOR JAILS, &c.
(Application filed Sept. 1, 1898.)
(No Model.)

Attest.
Ida Heitz
David J. Hauss.

Inventors.
Richard C. Stewart, Jr.
Wallace A. Stewart.
by James H. Layman.
Atty.

UNITED STATES PATENT OFFICE.

RICHARD C. STEWART, JR., AND WALLACE A. STEWART, OF COVINGTON, KENTUCKY.

BAR FOR JAILS, &c.

SPECIFICATION forming part of Letters Patent No. 618,962, dated February 7, 1899.

Application filed September 1, 1898. Serial No. 689,994. (No model.)

*To all whom it may concern:*

Be it known that we, RICHARD C. STEWART, Jr., and WALLACE A. STEWART, citizens of the United States, residing at Covington, in the county of Kenton and State of Kentucky, have invented certain new and useful Improvements in Bars for Jails, &c.; and we do hereby declare the following to be a full, clear, and exact description of the invention, reference being had to the annexed drawings, which form a part of this specification.

In the more recent and most approved construction of jails, prisons, and other similar houses of detention it is customary to make certain portions of their cells or gratings of bars or plates composed of alternate flat layers of hard and soft steel or iron securely welded together in order that the harder metal may resist the action of drills, files, and saws, while the relatively softer metal imparts such toughness or flexibility to the bar as to render its breakage an impossibility. Proceeding on this general principle of construction we build up a plate or bar; but instead of employing flat layers or strata of steel and iron our layers are corrugated or crimped on their meeting surfaces, thereby adding very materially to their strength, facilitating their proper rolling together, and rendering it more difficult to drill or saw through them. These corrugations or bends run longitudinally of the layers, are either curved or angular or other suitable shape, and are more or less numerous, according to the width and thickness of the bar, its length being a matter of no consequence.

In the more simple form of our composite bar it consists of three grooved or corrugated members—to wit., a pair of outer or softer plates inclosing a single hard layer or core; but we prefer using two hard layers and three softer ones, thereby producing a five-ply bar, as hereinafter more fully described.

Figure 1:
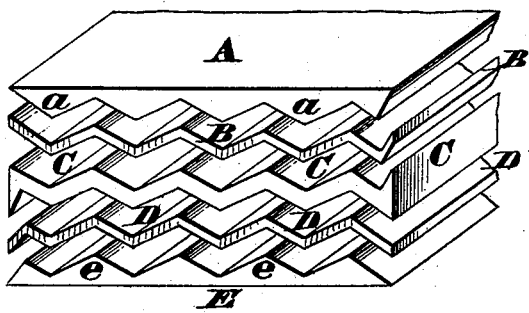
Figure 2:
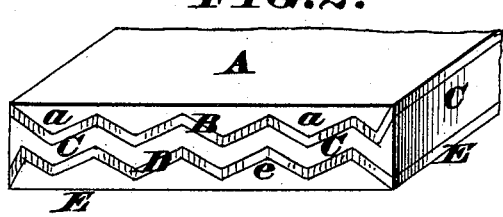

In the annexed drawings, Figure 1 is a perspective view showing all the members of our five-ply plate or bar separated from each other. Fig. 2 is a perspective view of a finished bar formed by rolling or welding together the aforesaid members. Figs. 3, 4, 5, 6, 7, and 8 show modifications of our invention. Fig. 9 is an enlarged vertical section showing how our five-ply bar resists the action of a drill.

Referring now to Figs. 1 and 2, A represents an iron or soft-steel bar, plate, or slab of any suitable length, width, and thickness, the outer or exposed side of said bar being flat or level, while its inner side is provided with parallel longitudinal grooves or flutes $a$. These grooves may be of any desired size, shape, and number; but in the present illustrations they are angular or V-shaped and their sides slope at the same pitch or inclination.

B is a plate of very hard steel of the same length and width as the plate A and provided with longitudinal corrugations that match with the grooves $a$ of said plate A. Plate B is the first layer of the composite bar.

C is a center plate or core, of relatively-softer steel or iron, which core is corrugated in the same manner as the layer B.

D is a second corrugated-steel layer, and E is a second soft-metal plate, the outer side of the latter being flat or level, while its inner side has V-shaped longitudinal grooves $e$.

The grooves and corrugations of these various members of our bar may be produced by any of the well-known machines used by metal-workers, and after said members are assembled together in the manner shown in Fig. 1, so as to form a pile or fagot, they are properly heated and then passed through rolls. Consequently said members are very securely welded together, and during this rolling operation the similarly-shaped grooves and corrugations interlock with each other in the most intimate manner and prevent any lateral spreading of any one plate beyond the others, the result being the formation of the symmetrical bar shown in Fig. 2. This built-up or composite bar or plate is now ready for use in any part of a prison or jail grating; but usually such bars are arranged horizontally and have circular holes made through them for the reception of round vertical bars of cells, &c. Prisoners in attempting to escape from these cells naturally drill in at the edge of a bar, so as to reach the circular holes, a proceeding of this kind being illustrated in Fig. 9. Here F represents a drill in the act of being bored into the edge of the soft-metal core C, which operation is at first very satisfactory to the prisoner; but the instant the point of the tool contacts with the steeply-inclined side of the hard-steel layer B the further penetration of the bar is instantly and finally arrested. Evidently the result would be the same if the bar were attacked from its opposite edge, as the drill would then encounter another inclined side of the hard-steel layer.

Figure 3:
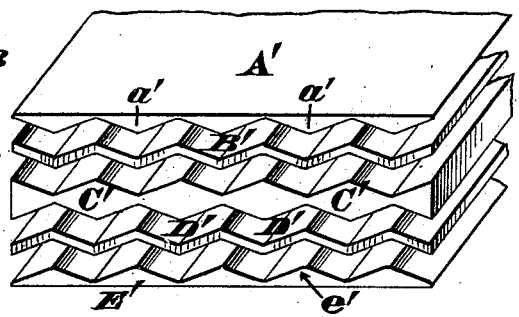
Figure 4:
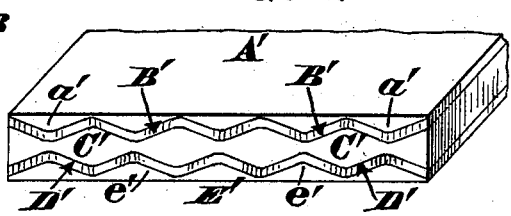

Having thus described the leading feature of our invention, numerous modifications of the same will suggest themselves to metal-workers or rolling-mill men, one self-evident change being shown in Figs. 3 and 4, where A' a' B' C' D' E' e' represent the component members of a five-ply plate shaped somewhat differently from the parts shown in Figs. 1 and 2. In these first two illustrations the apices of the corrugations of the lower layer D are vertically in line with the angles or most deeply indented portions of the corrugations of the upper layer B, and as the core C is fitted in between said layers it is evident the sides of said core are parallel zigzags; but in Figs. 3 and 4 the apices of the layers are vertically in line with each other and meet or substantially meet. Therefore the core C when viewed transversely, resembles a series of diamond-shaped figures joined at their ends. The other core G (shown in Fig. 5) is a single chevron-shaped plate, with its margins turned alternately up and down, as at g g', thereby protecting the opposite edges of the bar with hard-steel facings.

Figure 6:
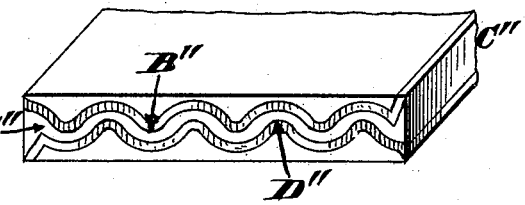

Fig. 6 carries out substantially the same arrangement shown in Fig. 2, but uses layers B'' D'', having rounded corrugations, and as a matter of course the core C'' is waved or sinuous.

Figure 7:
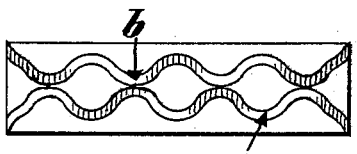

Fig. 7 duplicates the construction shown in Fig. 4, but uses layers b d, having rounded swells or corrugations.

Figure 5:
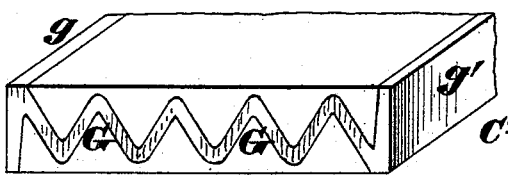
Figure 8:
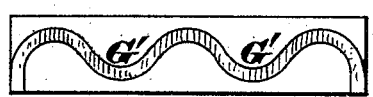
Figure 9:
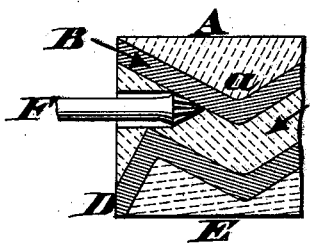

Fig. 8 is almost a duplicate of Fig. 5, the only difference being that in said Fig. 8 the single layer G' has rounded instead of angular bends; but each of these views shows what we call a "three-ply" bar, plate, or slab capable of being used for constructing cells, gratings, safes, vaults, and various other secure structures.

We claim as our invention—

1. A welded bar or plate composed of a longitudinally-corrugated steel center or core inclosed within a pair of soft-metal casings having, on their inner surfaces, grooves that interlock with said corrugations, in the manner described, and for the purpose stated.

2. A bar or plate composed of a number of hard and soft metal members, provided with angular corrugations, arranged as described, and welded together, for the purpose stated.

3. A bar or plate composed of a pair of outer, soft-metal members grooved longitudinally, a pair of longitudinally-corrugated hard-metal layers interposed between said outer members, and a soft-metal core between said layers, said core being grooved on both sides to interlock with said corrugated layers, for the purpose stated.

4. A welded bar or plate composed of a pair of outer soft-metal members A' E', grooved longitudinally at a', e'; a pair of angularly-corrugated hard-metal layers B' D', interposed between said outer members and a soft-metal core C', which core is grooved angularly on its sides to fit into the corrugations of said layers, all as herein described, and for the purpose stated.

In testimony whereof we affix our signatures in presence of two witnesses.

RICHARD C. STEWART, JR.
WALLACE A. STEWART.

Witnesses:
JAMES H. LAYMAN,
EARLE P. RASSEL.